United States Patent Office 2,846,182
Patented Aug. 5, 1958

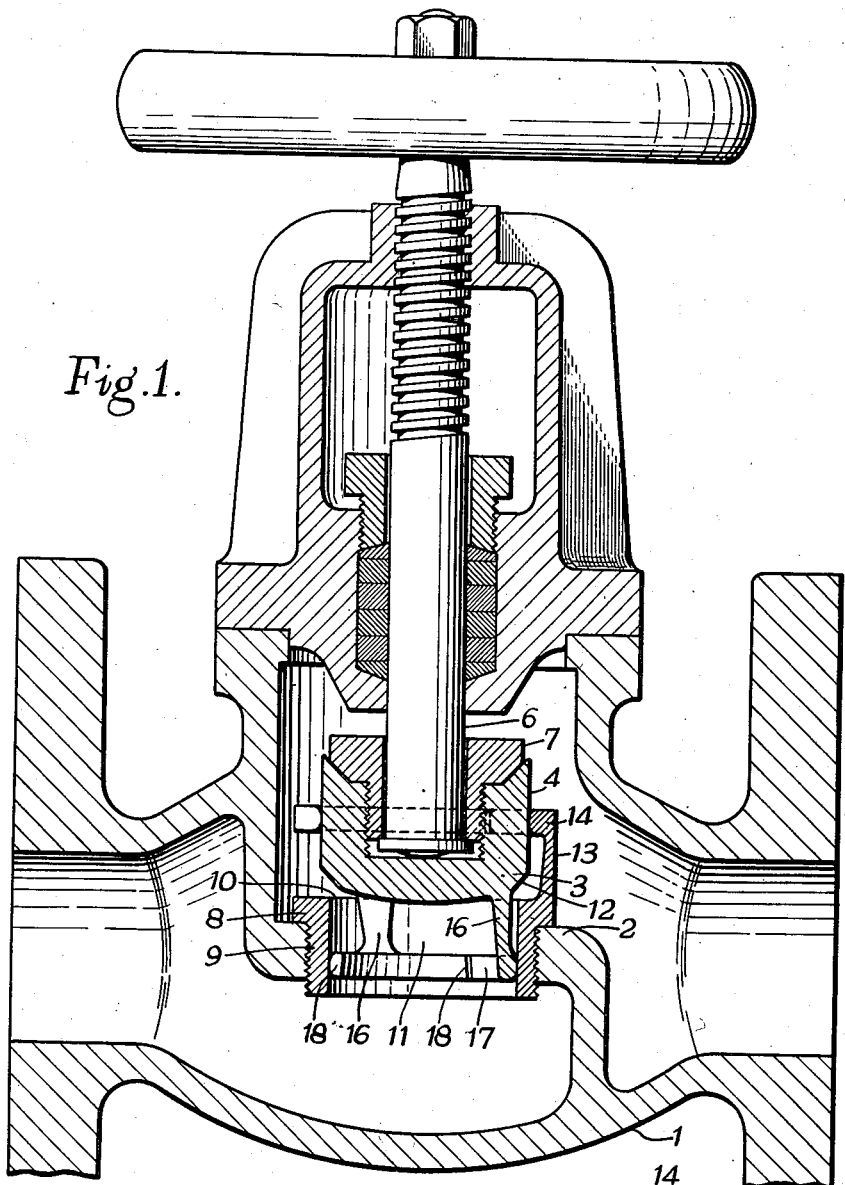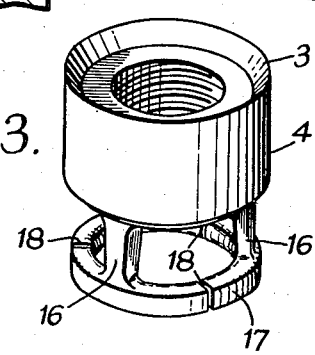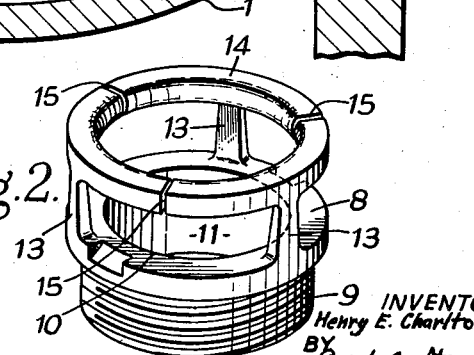

2,846,182

FLUID-CONTROL VALVES

Henry E. Charlton, Ashton-on-Mersey, England, assignor to Refinery Equipment & Specialty Company Limited, Manchester, England Application May 3, 1954, Serial No. 427,149

Claims priority, application Great Britain March 3, 1950

8 Claims. (Cl. 251—318)

The invention of this application, which is a continuation-in-part of my copending application Serial No. 211,926, filed February 20, 1951, now abandoned, relates to fluid-control valves of the kind comprising within a casing a valve plug co-operating with a valve seat bounding a valve aperture, closing and opening of the valve being effected by movement of the valve plug axially relative to the valve aperture.

Such valve plugs are commonly provided with a sealing surface of frusto-conical form, such sealing surface cooperating with a seating which may be a linear boundary of a valve aperture or again the seat at the valve aperture is frequently an annulus of frusto-conical form.

Difficulties frequently arise with such valves due to the departure of the valve plug from a position of true co-axiality with the valve aperture, this being particularly the case when the valve is disposed so that the movement of the valve plug is other than vertical, the valve plug, when the valve is being closed, first making engagement with the seat at one side of the valve aperture and giving rise to wear affecting the efficiency of the valve.

The object of this invention is an improved construction of valve whereby the valve plug is constrained to move with its sealing surface coaxially aligned with respect to the valve seating into the valve closing position.

In accordance with the invention a valve of the kind referred to above is provided within its casing with means for guiding the movement of the valve plug, which means comprise a slit ring making sliding engagement with a cylindrical surface and having its elements biased to make contact between the ring and the cylindrical surface throughout the entire travel of the valve plug, one of the two members consisting of the ring and the cylindrical surface being held in a position coaxially with respect to the valve seat or aperture and the other of these members being attached to or forming part of the valve plug so that the latter is constrained to move with its sealing surface coaxially aligned with respect to the valve seat.

In one form of construction in accordance with the invention, the valve comprises within the valve casing, a valve seat, bounding a valve aperture, a valve plug co-operating with the valve seat and movable axially relative to the valve aperture for opening and closing the valve, a cylindrical surface forming a cylindrical bore in register with the valve aperture and on the side thereof remote from the valve plug and of a length greater than the permitted stroke of the valve plug, a slit ring making sliding engagement within the cylindrical bore and attached to the valve plug by spaced connecting members of such length that the slit ring remains engaged within the cylindrical bore in both limit positions of the valve plug, the parts of the slit ring being biased outwardly to maintain contact between the ring and the cylindrical surface forming the said bore in all positions of the valve plug.

Another feature of the invention is that the valve plug is formed with a cylindrical outer surface of an axial length greater than the length of its permitted stroke, and a slit ring is held in a fixed position coaxially with respect to the valve aperture and making sliding engagement with said cylindrical outer surface in both limit positions of the valve plug, the parts of the slit ring being biased inwardly to maintain contact between the ring and said cylindrical outer surface in all positions of the valve plug.

The preferred form of construction in accordance with the invention consists in a construction having guiding means; both above and below the valve seating. The construction having guiding means both above and below the valve seat is particularly advantageous for large valves i. e. for valves in which the diameter of the valve aperture is 4 or more inches, though it may also be used with advantage for smaller valves.

The invention is illustrated by way of example in the accompanying drawings, in which:

Figure 1 is a view in sectional side elevation of a two-way valve provided with guiding means in accordance with the invention both above and below the valve seat.

Figures 2 and 3 are perspective views of the valve plug and valve seat members respectively of the valve shown in Figure 1.

Referring to Figures 1 to 3 of the drawings, 1 is the usual valve casing, usually formed as a casting, and having an apertured diaphragm 2 separating the inlet nd outlet ends of the casing.

The valve plug 3 is in the form of a cylindrical body having a cylindrical outer surface 4 and recessed for the reception of the flanged end 5 of a hand controlled spindle 6 and a retaining nut 7.

The valve aperture is formed by the upper end 8 of a tube 9 fixedly mounted in the diaphragm 2. The circumferential edge of the valve aperture forms the valve seating 10. The cylindrical inner surface of the tube 9 below the seat 10 forms the bore 11 in register with the valve aperture which is referred to above.

The valve plug 3 is provided at the end facing the valve aperture with an annular surface 12 of frusto-conical form for co-operation with the valve seat 10 to close the valve aperture. The plug 3 is moved towards and away from the seat 10 in usual fashion by the hand controlled spindle 6.

From the flanged upper end of the tube 9 extend three supports 13 carrying a slit ring 14 which is coaxial with the tube 9 and is slit into three arcuate parts or sections by the slits 15. The tube 9, the supports 13 and the slit ring 14 are formed as a unitary structure.

The slit ring 14 surrounds and is in contact with the cylindrical outer surface 4 of the valve plug 3. The ring 14 is so positioned and the axial length of the valve plug 3 is such that the ring 14 will remain in contact with the surface 4 in all positions of the plug 3. The internal diameter of the ring 14 in unstressed condition is slightly smaller than the external diameter of the valve plug 3, so that when the plug 3 is introduced into the ring 14, by stressing the parts of the latter outwardly these parts are thereafter resiliently biased inwardly to maintain continuous contact with the surface 4 of the plug 3. The inner surface of the supports 13 are spaced from the surface 4 so as not to make contact therewith in any position of the valve plug 3.

Depending downwardly from the valve plug 3 into the bore 11 of the tube 9 are three members 16 which carry a second slit ring 17 which is coaxial with the bore 11 and the valve plug 3 and is slit into three arcuate parts by the slits 18. The valve plug 3, the ring 17 and the connecting members 16 are formed as a unitary structure. The external diameter of the ring 17 in the unstressed condition is slightly larger than the internal diameter of the tube 9 so that when the ring 7 is introduced into the bore of the tube 9 by stressing its parts inwardly, these parts are thereafter resiliently biased outwardly to maintain continuous contact with the cylindrical inner surface forming the bore 11. The length and disposition of the tube 9 and the length of the members 16 are such that the ring 17 remains engaged within the bore in all positions of the valve plug 3. The members 16 are spaced from the surface forming bore 11 so that they do not make contact therewith in any position of the valve plug 3.

The inner surface of the ring 14 and the outer surface of the ring 17 are rounded as shown to provide line or substantially line contact between the rings 14 and 17 and the co-operating surfaces of the plug 3 and the bore 11 respectively.

It will readily be seen that with a valve of the construction described above, the valve plug will be constrained by the guiding action of the rings 14 and 17, to remain with its sealing surface 12 coaxial with the valve seat 10 throughout its movement between the open and closed positions.

I claim:

1. A fluid-control valve comprising within a valve casing, a valve seat bounding a valve aperture, a valve plug cooperating with the valve seat and movable axially relative to the valve aperture for opening and closing the valve and formed with a cylindrical outer surface of an axial length greater than the length of its permitted stroke, a cylindrical surface forming a cylindrical bore in register with the valve aperture and on the side thereof remote from the valve plug and of a length greater than the permitted stroke of the valve plug, a first slit ring held in a fixed position coaxially with respect to the valve aperture and formed of arcuate parts biased inwardly towards the center of said ring and making sliding engagement with said cylindrical outer surface of the valve plug in all positions of the valve plug and a second slit ring attached to the valve plug by spaced connecting members passing through the valve aperture and formed of arcuate parts biased outwardly from the center of said ring and making sliding engagement with the cylindrical surface forming the cylindrical bore in all positions of the valve plug.

2. A fluid-control valve as claimed in claim 1, in which said first slit ring is shaped to provide line contact with the outer cylindrical surface of the said valve plug.

3. A fluid-control valve as claimed in claim 1, in which said second slit ring is shaped to provide line contact with the surface forming the said cylindrical bore.

4. A fluid-control valve as claimed in claim 1, in which said first slit ring is carried by a number of spaced connecting members which are attached to a tubular member forming the said valve seat and are spaced from the said cylindrical outer surface of the valve plug.

5. A fluid-control valve as claimed in claim 1, in which the spaced connecting members attaching the said second slit ring to the said valve plug are spaced from the surface forming the said cylindrical bore.

6. A fluid-control valve as claimed in claim 4, in which the said first slit ring, the said tubular member and their connecting members form a unitary structure.

7. A fluid-control valve as claimed in claim 5, in which the said second slit ring, the said valve plug and their connecting members form a unitary structure.

8. A fluid-control valve comprising within a valve casing, a partition wall having a valve aperture formed therein, a tube removably mounted within said aperture and having a valve seat at one end thereof, a valve plug cooperating with the valve seat and movable axially relative to the valve aperture for opening and closing the valve and formed with a cylindrical outer surface of an axial length greater than the length of its permitted stroke, said tube having a cylindrical surface forming a cylindrical bore in register with the valve aperture and on the side thereof remote from the valve plug and of a length greater than the permitted stroke of the valve plug, a first guide ring surrounding the cylindrical portion of said plug and being held in a fixed position coaxially with respect to the valve aperture by supporting members spaced about said plug and supporting said ring directly from said tube independently of said casing, said ring making sliding engagement with said cylindrical outer surface of the valve plug in all positions of the valve plug, and a second guide ring attached to the valve plug by spaced connecting members passing through the valve aperture, said second guide ring making sliding engagement with the cylindrical surface forming the cylindrical bore in all positions of the valve plug.

References Cited in the file of this patent

UNITED STATES PATENTS

| 333,941 | Frisbie | Jan. 5, 1886 |
| 486,950 | Doolittle | Nov. 29, 1892 |
| 645,722 | Holmes | Mar. 20, 1900 |
| 991,550 | Serrell | May 9, 1911 |
| 1,304,724 | Young | May 27, 1919 |
| 1,710,635 | Wertz | Apr. 23, 1929 |
| 2,001,740 | Vallendor | Aug. 20, 1935 |

FOREIGN PATENTS

| 628,107 | Germany | of 1935 |